United States Patent
Bala et al.

(10) Patent No.: US 6,292,281 B1
(45) Date of Patent: Sep. 18, 2001

(54) PROTECTION FOR MEMS CROSS-BAR SWITCH

(75) Inventors: Krishna Bala, New York City, NY (US); W. John Tomlinson, Princeton, NJ (US)

(73) Assignee: Tellium, Inc., Oceanport, NJ (US)

( * ) Notice: Subject to any disclaimer, the term of this patent is extended or adjusted under 35 U.S.C. 154(b) by 0 days.

(21) Appl. No.: 09/275,414

(22) Filed: Mar. 24, 1999

(51) Int. Cl.[7] .................................................. H04B 10/08
(52) U.S. Cl. ............................. 359/110; 359/117; 385/18
(58) Field of Search .................................... 359/110, 117, 359/128; 385/16–18

(56) References Cited

U.S. PATENT DOCUMENTS

| | | | |
|---|---|---|---|
| 5,325,224 | | 6/1994 | Lang et al. ............................ 359/139 |
| 5,960,132 | * | 9/1999 | Lin ......................................... 385/18 |
| 5,960,133 | * | 9/1999 | Tomlinson ............................. 385/18 |
| 6,038,044 | * | 3/2000 | Fee et al. .............................. 359/110 |
| 6,075,239 | * | 6/2000 | Aksyuk et al. ........................ 385/16 |
| 6,097,859 | * | 8/2000 | Solgaard et al. ...................... 385/17 |

OTHER PUBLICATIONS

Schaffer, Richard A., "The Next Big Switch Will Be Optical," Jun. 22, 1998.
Lin, Lih Y., "Fiber–Optic Free Space Matrix Switches with L560 µS Switching Time by Micromachining".
2+2 Fiber Optic Switch, Dec. 10, 1998 http///www–imt–dr.unine. Ch/projects/Optical—MEMS/2+2fiber.html.
Free–Space Fiber Optic Switch for Optical Network Applications Jan. 19, 1999, http://www.ee.ucla.edu/labs/laser/research/mot/2switch.html.

* cited by examiner

Primary Examiner—Kinfe-Michael Negash
(74) Attorney, Agent, or Firm—Morgan, Lewis & Bockius LLP

(57) ABSTRACT

A protection system for a micro electro-mechanical system (MEMS) cross-bar switch is described. Optical signals that are cross-connected by a N×N optical matrix switch are routed through alternative protection paths using protection switch elements. The protection switch elements are incorporated as part of the silicon wafer based fabricated structure that forms the N×N optical matrix. The protection switch elements enable the N×N optical matrix switch to recover from one or more failures in switch elements of the N×N optical matrix using alternative protection paths that have the same path length as the original optical path.

32 Claims, 2 Drawing Sheets

PROTECTION FOR MEMS CROSS-BAR SWITCH

BACKGROUND OF THE INVENTION

1. Field of the Invention

Figure 1:
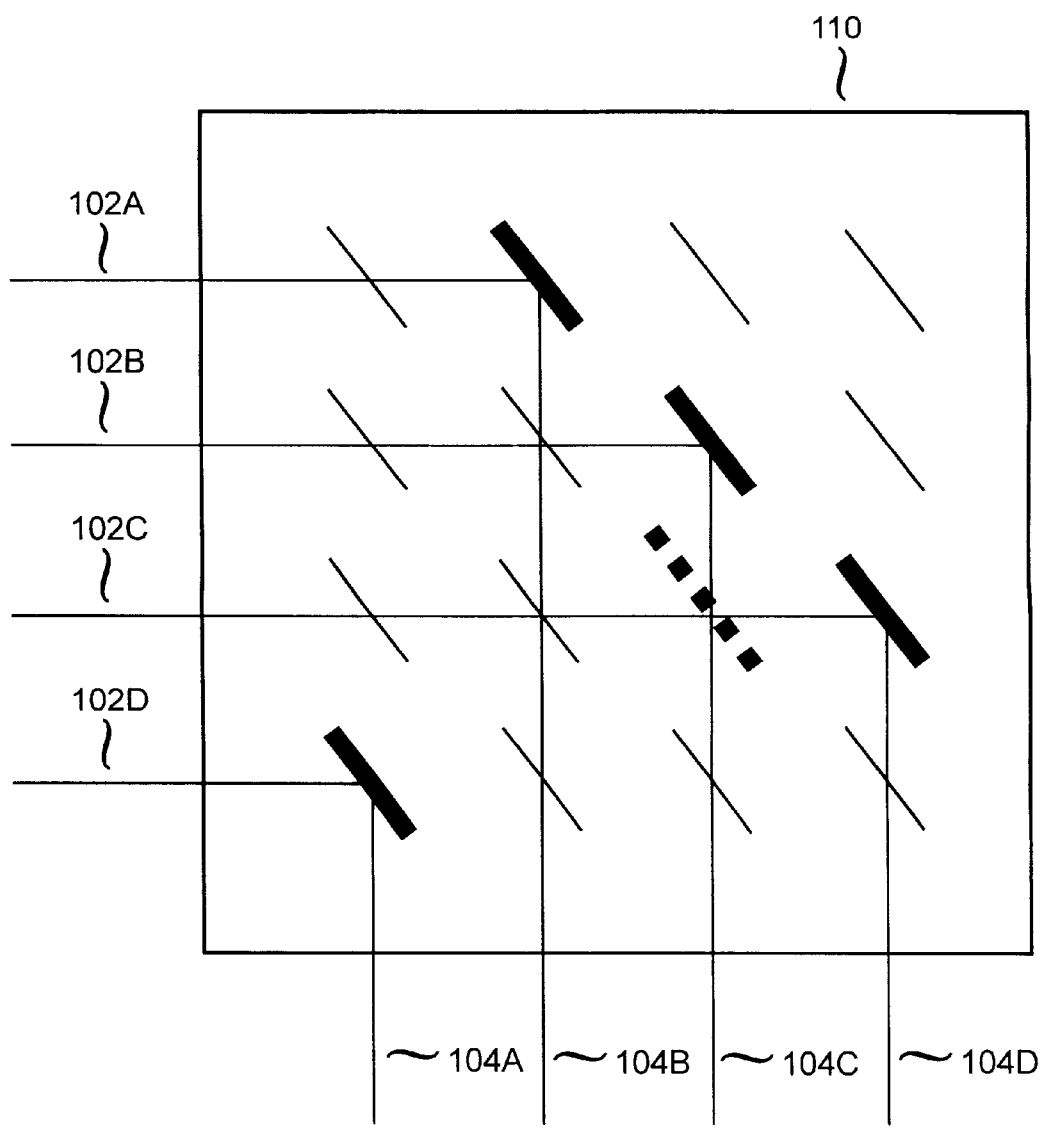

The present invention relates generally to optical matrix switches, and more specifically, to protection mechanisms for micro electro-mechanical system (MEMS) cross-bar switches.

2. Discussion of the Related Art

Fiber optic technology has continued to expand across today's data communication networks. Having replaced many of the long-haul connections and other inter-office facilities, fiber optics technology has begun to replace transmission facilities and network elements used in intra-office communication. One of the primary network elements used in intra-office communication is the digital cross-connect. Generally, digital cross-connects link any of several incoming lines to any of several outgoing lines. Today's digital cross-connects switch digital signals on the electrical level. Thus, a fiber optic terminal that receives an optical signal must convert the optical signal to an electrical signal before it sends it to the digital cross-connect.

Optical cross-connects are envisioned as the replacement for the conventional digital cross-connect. Optical cross-connects switch signals at the optical level and therefore obviate the need for optical-to-electrical conversions. The elimination of unnecessary components can lower the overall cost of the network while also increasing the reliability of the network. Reliability is a paramount concern to network planners and bandwidth providers. For optical cross-connects to be considered as viable replacements for digital cross-connects, the reliability of the optical cross-connects must meet reasonable reliability expectations.

SUMMARY OF THE INVENTION

The present invention addresses reliability concerns of micro electro-mechanical system (MEMS) cross-bar switches by providing alternative protection paths for optical signals that are cross-connected by a N×N MEMS cross-bar switch. The N×N optical cross-bar switch receives, on a first side, input optical signals from an array of one or more input lines (i), and outputs, on a second side, output optical signals to an array of one or more output lines (j). Because of the physical distance the light must propagate between the input and output lines, the input lines are typically provided with lenses to convert the signal on an input fiber into a collimated beam, and the output lines are similarly provided with lenses to focus the output collimated beam onto the output fiber. The design of such collimating and focusing lenses is critically dependent on the required optical path length between the two lenses. Cross connection within the N×N switch matrix is effected through the activation of selected switch elements. For example, input line (i) can be connected to output line (j) by activating switch element (i,j) in the N×N cross-bar switch. In addition to the N×N matrix of switch elements, the MEMS cross-bar switch of the present invention includes a N×M matrix of protection switch elements, a M×N matrix of protection switch elements, and a set of at least M protection switch elements.

The N×M matrix of protection switch elements is positioned between the array of input lines (i) and the first side of the N×N optical cross-bar switch such that the N rows of the N×M matrix of protection switch elements are aligned with the N rows of the N×N optical cross-bar switch. The M×N matrix of protection switch elements is positioned between the second side of the N×N optical cross-bar switch and the array of one or more output lines (j) such that the N columns of the M×N matrix of protection switch elements are aligned with the N columns of the N×N optical cross-bar switch. Finally, each of the M protection switch elements in the set of at least M protection switch elements is aligned with one of the M columns of the N×M matrix of protection switch elements and one of the M rows of the M×N matrix of protection switch elements.

This configuration of protection switch elements in combination with the N×N optical cross-bar switch enables a portion of an original path of an optical signal from an input line (i) that is connected to an output line (j) via switch element (i,j) in the N×N optical cross-bar switch to be switched to an alternative protection path that traverses a path between a first protection switch element in row (i) of the N×M matrix of protection switch elements, a second protection switch element in column (j) of the M×N matrix of protection switch elements, and a protection switch element in the set of at least M protection switch elements that is aligned with the first and second protection switch elements. It is a feature of the present invention that the path length of the alternative protection path is the same as the original path of the optical signal.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention.

Figure 2:
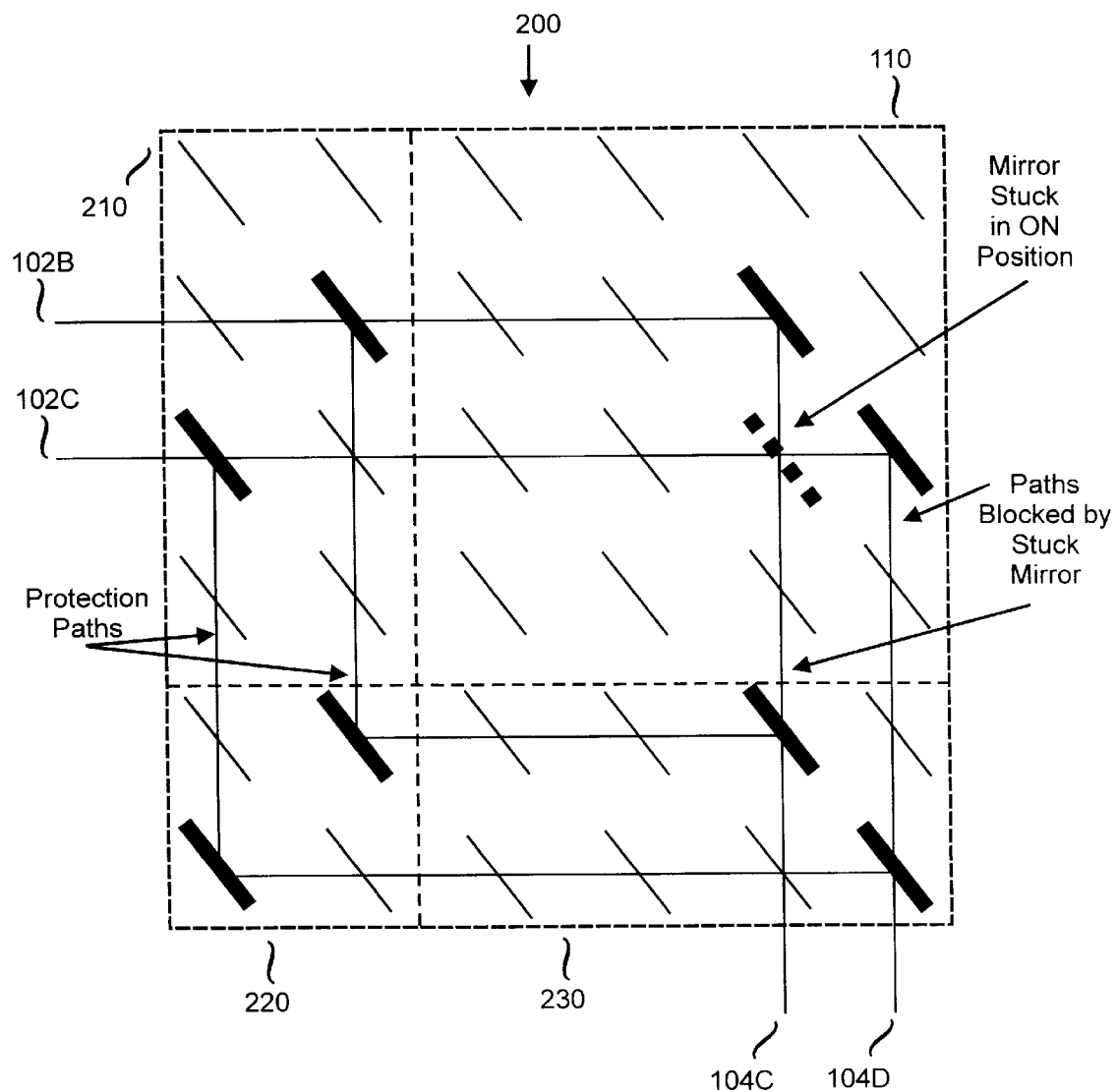

In the drawings:

FIG. 1 illustrates a micro electro-mechanical systems (MEMS) cross-bar switch; and FIG. 2 illustrates a protection mechanism for a MEMS cross-bar switch.

DETAILED DESCRIPTION OF THE PREFERRED EMBODIMENTS

Reference will now be made in detail to the preferred embodiments of the present invention, examples of which are illustrated in the accompanying drawings.

The field of micro electro-mechanical systems (MEMS) is a revolutionary, enabling technology. Using an ever-expanding set of fabrication processes and materials, MEMS will provide the advantages of small size, low power, low mass, low-cost and high-functionality to integrated electromechanical systems.

One application of MEMS technology is to opto-electromechanical devices such as fiber-optic cross-bar switches. Fiber-optic cross-bar switches are envisioned as playing a key role in the evolution of data communication networks. Today, electrical digital signal cross-connects are used to link a set of incoming lines to a set of outgoing lines. This type of electrical cross-connection requires additional optical-to-electrical and electrical-to-optical conversion components between a set of network elements. Fiber-optic cross-bar switches would obviate the need for these conversion elements.

An example of a MEMS cross-bar switch is illustrated in FIG. 1. MEMS cross-bar switch 110 is a silicon wafer based fabricated structure that includes a 4×4 matrix of switch elements. Each of the switch elements represents a mirror that is operatively moved into the center of the optical path junction at a 45° angle. When the mirror is moved into the optical path, the switch operates in the "reflection" mode; and when the mirror is moved out of the optical path, the switch operates in the "through" mode. Various micro electro-mechanical structures can be used to effect a movement of the mirror into and out of the optical path. In one embodiment, the mirror is pushed into or pulled out of the optical path. In another embodiment, the mirror is moved into and out of the optical path through a pivot mechanism. The movement of the mirror into the optical path is referred to below as the activation of the switch element.

As illustrated in FIG. 1, the switch elements serve to connect input optical lines 102A–102D to output optical lines 104A–104D. Because of the physical distance the light must propagate between the input and output lines, the input lines are typically provided with lenses (not shown) to convert the signal on an input fiber into a collimated beam, and the output lines are similarly provided with lenses (not shown) to focus the output collimated beam onto the output fiber. The design of such collimating and focusing lenses is critically dependent on the required optical path length between the two lenses.

In the MEMS cross-bar switch 110 illustrated in FIG. 1, input line 102A is connected to output line 104B, input line 102B is connected to output line 104C, input line 102C is connected to output line 104D, and input line 102D is connected to output line 104A. These specific connections are enabled through the activation of switch element (1,2), switch element (2,3), switch element (3,4), and switch element (4,1), respectively, where switch element (i,j) refers to the switch element in row i, column j of the 4×4 MEMS cross-bar switch 110.

One of the key concerns regarding the adoption and use of MEMS cross-bar switches is the reliability of the switching mechanisms. Once a mirror is stuck in either the activated or inactivated position, the entire MEMS cross-bar switch must be replaced because there is no way to do an in-service repair of the defective actuator that controls the faulty switch element.

The effect of a faulty switch element is dependent upon whether the switch element is stuck in either the activated or inactivated position. If the switch element is stuck in the inactivated position (i.e., the mirror is stuck outside the optical path), only one connection will be affected. For example, if switch element (1,2) was stuck in an inactivated position, input line 102A would not be able to be connected to output line 104B. No other connection would be affected.

On the other hand, if a switch element is stuck in the activated position (i.e., mirror is stuck in the optical path), two connections could potentially be disrupted. FIG. 1 illustrates a potential fault in switch element (3,3). If this switch element is stuck in an activated position, the connection between input line 102B and output line 104C and the connection between input line 102C and output line 104D would both be disrupted.

As noted, a switch element cannot be repaired in service. Accordingly, MEMS cross-bar switch 110 would have to be replaced in its entirety should switch element (3,3) fail. The replacement of MEMS cross-bar switch 110 would cause a significant disruption in the data communications network. Upon replacement of MEMS cross-bar switch 110, all optical signals that traverse MEMS cross-bar switch 110 would either have to be transferred to an external protection path or taken off line, thereby leaving a substantial part of the network either unprotected or in a failed state.

The present invention addresses the potential reliability issues of MEMS cross-bar switches by incorporating internal protection paths within the MEMS cross-bar switch. In other words, the protection paths are included as part of the silicon wafer based fabricated structure that forms the MEMS cross-bar switch.

An example of a MEMS cross-bar switch that incorporates a protection structure is illustrated in FIG. 2. MEMS cross-bar switch 200 includes the 4×4 matrix of switch elements that formed MEMS cross-bar switch 110. Additionally, MEMS cross-bar switch 200 includes protection switch element sections 210, 220, and 230. In this particular example, protection switch element section 210 is a 2×4 switch matrix, protection switch element section 220 is a 2×2 switch matrix, and protection switch element section 230 is a 2×4 switch matrix. As described below, protection switch element sections 210, 220, and 230, in combination, enable MEMS cross-bar switch 200 to recover from failures in switch elements of the original 4×4 matrix of switch elements 110.

To demonstrate the protection feature of MEMS cross-bar switch 200, FIG. 2 focuses on the connection between input line 102B and output line 104C and the connection between input line 102C and output line 104D. As noted, both of these connections would be disrupted if switch element (3,3) in matrix switch section 110 became stuck in an activated position.

In this failure scenario, switch elements in protection switch element sections 210, 220, and 230 can be selectively activated to re-route the failed connections. This re-routing is handled internally by MEMS cross-bar switch 200. Accordingly, one or more failures in matrix switch section 110 would not require the replacement of MEMS cross-bar switch 200.

As illustrated, a portion of the original path of the connection between input line 102B and output line 104C is re-routed using switch element (2,2) in protection switch element section 210, switch element (1,2) in protection switch element section 220, and switch element (1,3) in protection switch element section 230; and a portion of the original path of the connection between input line 102C and output line 104D is re-routed using switch element (3,1) in protection switch element section 210, switch element (2,1) in protection switch element section 220, and switch element (2,4) in protection switch element section 230.

Significantly, each of the protection paths that are set up to replace a portion of the failed connection does not change the total path length of the connection between the input and output lines. For example, the path length between switch element (2,2) in protection switch element section 210, switch element (1,2) in protection switch element section 220, and switch element (1,3) in protection switch element section 230 would be equivalent to the path length between switch element (2,2) in protection switch element section 210, switch element (2,3) in matrix switch section, and switch element (1,3) in protection switch element section 230. This feature of the present invention eliminates the need for compensating lenses in the protection path. More importantly, the inclusion of a protection mechanism within the MEMS cross-bar switch itself reduces the likelihood and immediacy of replacement of the entire MEMS cross-bar switch 200.

It should be noted that MEMS cross-bar switch 200 can be configured to accommodate any amount of protection paths. In the example of FIG. 2, MEMS cross-bar switch 200 is capable of accommodating two protection paths. Conversely, if protection switch element sections 210, 220, and 230 are each configured as a 4×4 matrix of switch elements, then MEMS cross-bar switch 200 could accommodate four protection paths, one each for the four connections that can be cross-connected through matrix switch section 110.

In the embodiment discussed above, the switch elements in protection switch element section 220 are switchable based on some form of system control. In an alternative embodiment, selective switch elements in protection switch element section 220 can be fixed in an activated position. For example, as illustrated in FIG. 2, switch elements (1,2) and (2,1) of protection switch element section 220 can be fixed in an activated position to accommodate the two illustrated protection paths. Alternatively, switch elements (1,1) and (2,2) of protection switch element section 220 can be fixed in an activated position. In this case, the original path of the connection between input line 102B and output line 104C is re-routed using switch element (1,2) in protection switch element section 210, switch element (1,1) in protection switch element section 220, and switch element (1,3) in protection switch element section 230; and a portion of the original path of the connection between input line 102C and output line 104D is re-routed using switch element (3,2) in protection switch element section 210, switch element (2,2) in protection switch element section 220, and switch element (2,4) in protection switch element section 230.

It should be noted that most network architectures assume that all paths are two-fiber, two-way. In cross-connecting such 2-way signals, one has to switch the signals in both directions. This is accomplished by having two identical cross-connects, one for each direction. If the 2-way paths are always cross-connected in the same way, a considerable simplification and cost saving in the cross-connect can be achieved by using a dual design. For a dual design, each input port is replaced by a pair of ports, which would have different collimators, but would be reflected by the same switch element. Similarly, each output port is replaced by a pair of output ports. In this dual design, the physical size of the switch matrix would need to be increased to accommodate the additional collimators, but the total number of switch elements (and protection switch elements) is unchanged.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. An optical switch system having a protection optical path, comprising:
    a plurality of optical input lines for carrying optical signals;
    a plurality of optical output lines; and
    an optical switch for directing light beams from the optical input lines to selected optical output lines, said optical switch comprising a plurality of miniature working mirrors for reflecting light beams in optical paths from the optical input lines to the selected optical output lines and a plurality of miniature protection mirrors movable into the optical paths in the event of a fault in light communication of one or more light beams from the input optical lines to the selected output optical lines, said miniature protection mirrors for directing light beams ultimately to the selected optical output lines.

2. An optical system according to claim 1, wherein said miniature mirrors are fabricated on a silicon wafer.

3. An optical switch system according to claim 1, wherein said miniature mirrors are micro electro-mechanical system (MEMS) elements.

4. An optical switch system according to claim 1, wherein said miniature protection mirrors are individually movable into the optical paths.

5. An optical switch system according to claim 1, further comprising additional miniature mirrors for reflecting light beams received from said miniature protection mirrors.

6. An optical switch system according to claim 1, further comprising additional miniature protection mirrors for reflecting light beams received from said miniature protection mirrors.

7. An optical switch system according to claim 1, further comprising a first plurality of additional miniature protection mirrors and a second plurality of additional protection mirrors, wherein, when one of said miniature protection mirrors is moved into an optical path, the miniature protection mirror directs the light beam to one of said first plurality of additional miniature protection mirrors, which directs the light beam to one of the second plurality of additional protection mirrors.

8. An optical switch system according to claim 1, wherein one of said miniature protection mirrors is moved into an optical path in the event of fault of light communication through that optical path.

9. An optical switch system according to claim 1, wherein multiple miniature protection mirrors are moved into multiple optical paths in the event of fault of light communications through one of the multiple optical paths.

10. A method of switching light beams from input optical fibers to output optical fibers in an optical switch system, the method comprising:
    directing light beams in first optical paths from input optical fibers to selected output optical fibers using miniature mirrors, and
    in the event of a fault in light communication of a light beam from an input optical fiber to its selected output optical fiber, redirecting the light beam using an additional miniature mirror, wherein the redirected light beam traverses a protection optical path from the input optical fiber to the selected output optical fiber.

11. The method according to claim 10, wherein said miniature mirrors are fabricated on a silicon wafer.

12. The method according to claim 10, wherein said miniature are micro electro-mechanical systems (MEMS) elements.

13. A method of switching light beams between input optical fibers and output optical fibers in an optical switch system, the method comprising:
    directing light beams in first optical paths from input optical fibers to selected output optical fibers using miniature mirrors, and
    in the event of a fault in light communication of a light beam from an input optical fiber to its selected output optical fiber, redirecting the light beam from the first optical path to a protection miniature mirror in a protection optical path to the selected output optical fiber.

14. The method according to claim 13, wherein said miniature mirrors and said protection miniature mirror are fabricated on a silicon substrate.

15. The method according to claim 13, wherein said miniature mirrors and said protection miniature mirror are micro electro-mechanical system (MEMS) elements.

16. A method of switching light beams between input optical fibers and output optical fibers in an optical switch system, the method comprising:
directing light beams in first optical paths from input optical fibers to selected output optical fibers using miniature mirrors, and
in the event of a fault in light communication of a light beam from an input optical fiber to its selected output optical fiber, moving a protection miniature mirror into the first optical path of the light beam, said protection miniature mirror directing the light beam ultimately to its selected optical output fiber.

17. The method according to claim 16, wherein said miniature mirrors and said protection miniature mirror are fabricated on a silicon substrate.

18. The method according to claim 16, wherein said miniature mirrors and said protection miniature mirror are micro electro-mechanical system (MEMS) elements.

19. A protection optical switching method in an optical switch that directs light beams in first optical paths from input optical fibers to output optical fibers using miniature mirrors, the protection optical switching method used in the event of a fault in light communication of a light beam from an input optical fiber to its selected output optical fiber, the method comprising:
directing the light beam from the first optical path to a first protection optical path link using a miniature mirror;
directing the light beam from the first protection optical path link to a second optical path link using a miniature mirror; and
directing the light beam from the second protection optical path link to the selected output optical fiber using a miniature mirror.

20. The method according to claim 19, wherein said miniature mirrors are fabricated on a silicon substrate.

21. The method according to claim 19, wherein said miniature mirrors are micro electro-mechanical system (MEMS) elements.

22. A protection optical switching method in an optical switch that directs light beams in first optical paths from input optical fibers to output optical fibers using miniature mirrors, the protection optical switching method used in the event of a fault in light communication of a light beam from an input optical fiber to its selected output optical fiber, the method comprising:
moving a miniature mirror into the first optical path; and
directing the light beam ultimately to the selected optical output fiber.

23. The method according to claim 22, wherein said miniature mirror is fabricated on a silicon substrate.

24. The method according to claim 22, wherein said miniature mirror is a micro electro-mechanical system (MEMS) element.

25. An optical switch system having a protection optical path, comprising:
a plurality of optical input lines for carrying light beams carrying optical signals;
a plurality of optical output lines; and
an optical switch for directing light beams from the optical input lines to selected optical output lines, said optical switch comprising a plurality of miniature working mirrors for reflecting the light beams in optical paths from the optical input lines to the selected optical output lines and a plurality of miniature protection mirrors receiving one or more of the light beams in the event of a fault in light communication of one or more light beams from input optical fibers to output optical fibers, said miniature protection mirrors for directing the one or more received light beams ultimately to the selected optical output fibers.

26. An optical switch according to claim 25, wherein said miniature mirrors are fabricated on a silicon wafer.

27. An optical switch according to claim 25, wherein said miniature mirrors are micro electro-mechanical system (MEMS) elements.

28. An optical switch according to claim 25, wherein a miniature protection mirror of said plurality of miniature protection mirrors receives one light beam in the event of the fault in light communication.

29. An optical switch according to claim 25, further comprising additional miniature protection mirrors movable into said optical paths to receive said lights beams, said additional miniature protection mirrors for directing one or more of the light beams to said miniature protection mirrors.

30. An optical switch system having a protection optical path, comprising:
a plurality of input optical waveguides for carrying input optical signals traveling in a first direction;
a plurality of output optical waveguides for receiving reflected input optical signals traveling in a second direction different than the first direction;
a matrix of switch elements arranged in multiple rows and columns and selectably providing a reflective surface to enable the input optical signals to be selectably coupled to each output optical waveguide;
a protection column of protection switch elements;
a protection row of protection switch elements;
an optical reflector provided at the intersection of the column of protection switch elements and the row of protection switch elements, wherein in the event of failure of optical communication of an optical signal from one of the input optical waveguide to its selected one of the output optical waveguides, wherein a protection switch element of the protection column reflects the optical signal to the optical reflector, the optical reflector reflects the optical signals to a protection switch element of the protection row, and the protection switch element of the protection row reflects the optical signal to the selected one of the output optical waveguides, thereby providing at least a portion of a protection optical path.

31. An optical switch system having a protection optical path, comprising:
a plurality of first optical waveguides carrying optical signals;
a plurality of second optical waveguides for receiving reflected optical signals;
a switch matrix including (a) optical switch elements for selectably reflecting the optical signals from the first optical waveguides to selected second optical waveguides to provide optical communication between the first optical waveguides and the second optical waveguides, and (b) a plurality of optical protection switch elements including first protection switch elements, second protection switch elements, and an optical reflector that provide a protection optical path for the optical signals between a first optical waveguide and its selected second optical waveguide, the optical protection path bypassing the optical switch elements.

32. An optical switch system having a protection optical path comprising:

a plurality of input optical waveguides and a plurality of output optical waveguides;

an optical switching matrix for selectively coupling optical signals from each of the input optical waveguides to selected output optical waveguides, said matrix including rows and columns of multiple optical switch elements for selectively reflecting the optical signals from each input optical waveguide to its selected output optical waveguide, wherein the rows of the optical switching elements correspond to the input optical waveguides and the columns of optical switch elements correspond to the output optical waveguides, said matrix further including a column of first optical protection switch elements, a row of second protection switch elements, and an optical reflector that together provide at least a portion of a protection optical path in the event of a fault in optical communication of the optical signals from an input optical waveguide to its selected output optical waveguide, wherein a first optical protection switch element is configured to reflect the optical signal to the optical reflector, the optical reflector is arranged to reflect the optical signal to a second optical protection switch element, and the second optical protection switch element is configured to reflect the optical signal to its selected output waveguide.

* * * * *